United States Patent
Waldrum

[15] 3,648,935
[45] Mar. 14, 1972

[54] SPRAY APPARATUS WITH MOVABLE HEAD

[72] Inventor: John E. Waldrum, Ambler, Pa.
[73] Assignee: Amchem Products, Inc., Ambler, Pa.
[22] Filed: Feb. 4, 1970
[21] Appl. No.: 8,581

[52] U.S. Cl............................................236/659, 239/685
[51] Int. Cl.......................................................A01c 15/02
[58] Field of Search..................239/214, 223, 224, 156, 286, 239/681, 659, 685

[56] References Cited

UNITED STATES PATENTS

| | | | |
|---|---|---|---|
| 2,975,755 | 3/1961 | Reindl | 239/223 X |
| 3,527,115 | 4/1969 | Muhleck | 74/476 |
| 686,141 | 11/1901 | Schanck | 239/156 |
| 990,335 | 4/1911 | Cantwell | 239/156 |
| 1,102,786 | 7/1914 | Murphy | 239/223 |
| 1,340,806 | 5/1920 | Travis | 239/156 |

FOREIGN PATENTS OR APPLICATIONS

| | | | |
|---|---|---|---|
| 665,655 | 1/1952 | Great Britain | 239/224 |
| 787,730 | 12/1957 | Great Britain | 239/659 |
| 25,631 | 9/1930 | Australia | 239/223 |
| 447,327 | 10/1912 | France | 239/156 |
| 45,584 | 4/1932 | Denmark | 239/156 |

Primary Examiner—M. Henson Wood, Jr.
Assistant Examiner—Edwin D. Grant
Attorney—Caesar, Rivise, Bernstein & Cohen

[57] ABSTRACT

A spray apparatus for applying agricultural liquids, the apparatus including an oscillating or otherwise moving spray head which has many projecting fingers that are pointed at their free ends in the preferred embodiment, the spray head being generally horizontally disposed, with the liquid material being supplied onto the spray head wherein the liquid is projected by centrifugal force onto the projecting fingers and then discharged therefrom in large drops of a substantially uniform size to give a very uniform spray pattern.

9 Claims, 6 Drawing Figures

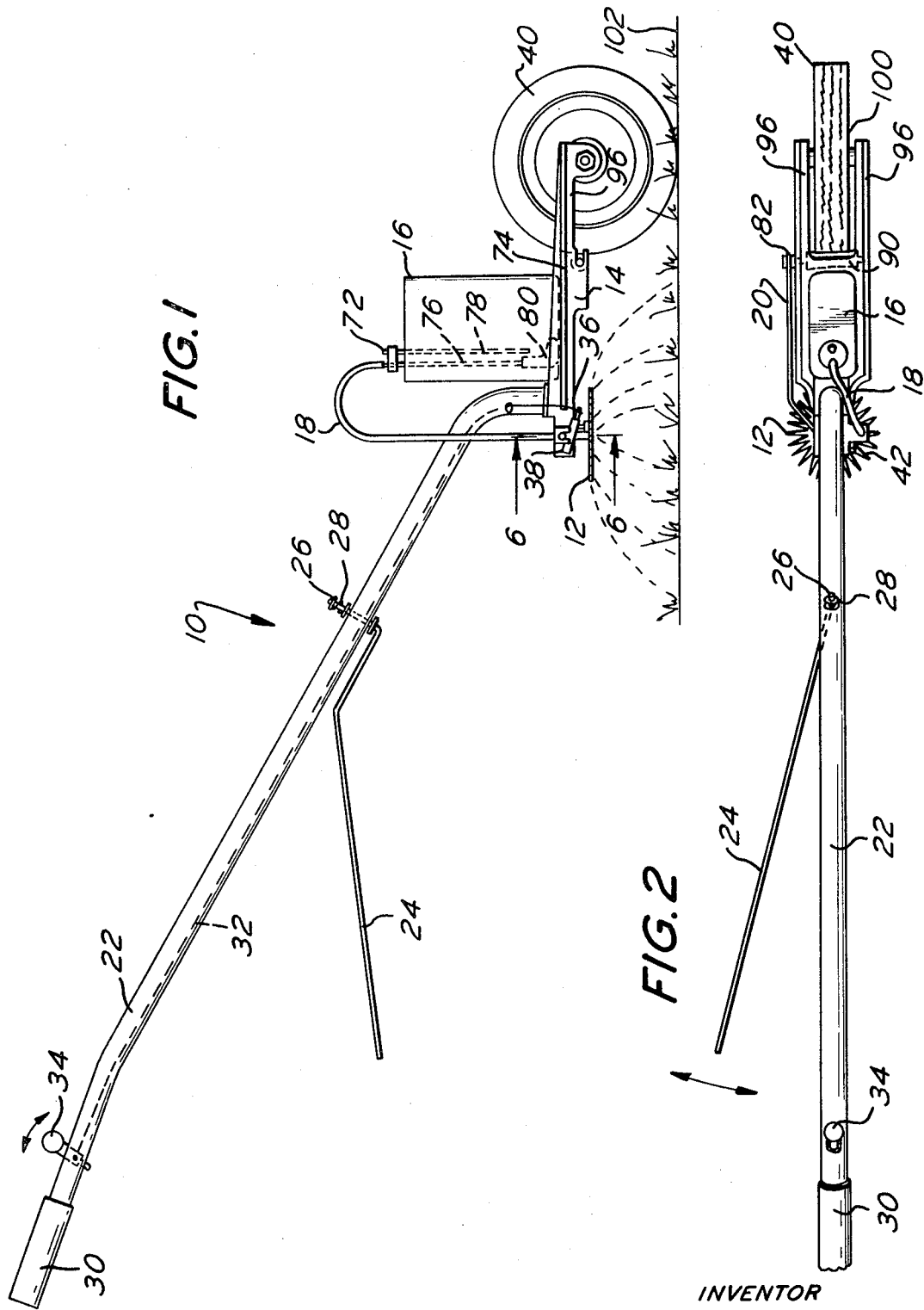

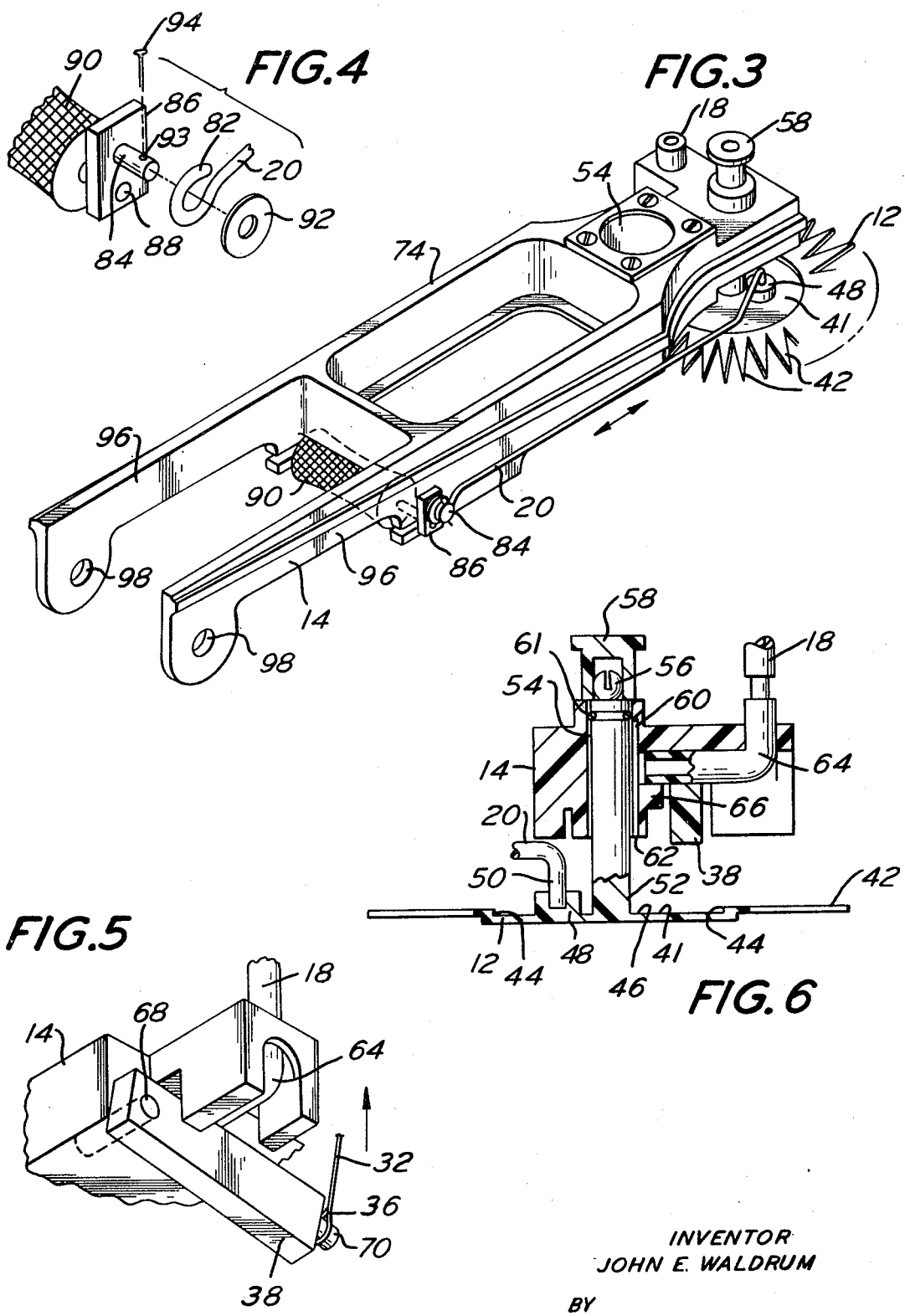

SPRAY APPARATUS WITH MOVABLE HEAD

This invention relates to apparatus for applying low volumes of liquids, such as agricultural sprays as exemplified by herbicides. In particular, the invention is devoted to apparatus, particularly hand-powered and hand-controlled apparatus for use by a gardener, which will apply low volumes of concentrated materials in a uniform way.

The spraying of active materials generally is accomplished through the use of such materials in dilute form. This is because a dilute spray almost necessarily insures a uniform coverage. Relatively minor variations in flow rate or even in compounding are not significant in view of the dilute nature of the material being sprayed and the relatively high volumes under which spraying occurs. A typical example of such an active material is a herbicide, and it is quite normal to apply herbicidal mixtures at rates from 10 to 100 gallons per acre and sometimes even higher. In view of these large volumes, the only practical solvent is water, and thus, where the active ingredient is not soluble in water, additional difficulties arise, with it being necessary to create some type of solution or emulsion which can be admixed with water.

The handling of large volumes of liquid adds considerably to the complexity and the expense of the spray operation. Furthermore, if the herbicide is a systematic herbicide a serious problem can be caused by drift since the large spray rates and the use of high pressure atomizing nozzles necessarily creates many fine droplets which can be carried away by normal wind currents to unwanted areas. This is particularly so when employing the herbicide in a garden where the spray area is almost certain to be surrounded by desirable plants, such as flowers, shrubs or vegetables, which may well be highly susceptible to the chemicals used.

Thus, the present invention contemplates the application of the herbicide in a concentrated form. However, in the case of concentrated herbicides, problems are encountered in view of the requirements for a uniform spray of large drop size. It is known to apply concentrated materials, like insecticides, in an atomizing spray where the production of fine particles which have a tendency to drift does not present a serious problem since the misdirected particles of insecticide will not normally produce the deadly results of a systemic herbicide where even a few droplets can kill a large segment of desirable crops and plants.

In the case of a concentrated herbicide, if too little of the herbicide is applied, no herbicidal effect will be achieved. If too much herbicide is applied the excess is not only expensive, but there could be an adverse effect upon the desirable plants in which the "weeds" are growing, for example, the grass in a lawn or the economic crop in a field.

In addition to the foregoing, the user of the spray normally purchases the herbicide in concentrated form. He then often has to become involved with the expense and trouble of admixing the herbicidal concentrate with large volumes of water. Where the herbicide is not sufficiently water soluble, it will also have to be formulated to prepare it for mixing with water.

It is therefore a prime object of the present invention to provide a low volume spray apparatus where ideally the gardener or farmer will be able to purchase the herbicide in concentrated form and simply use it in that form, thereby eliminating the time, expense and trouble which for many years has been an accepted part of his duties.

While the present invention is to be described in terms of concentrated herbicides, and the main emphasis is laid on the apparatus as a garden tool, it is to be understood that the low volume spray apparatus hereinafter described and claimed is suitable for use for other purposes, and while concentrated liquids are preferably used, it is to be recognized that the present invention even has application with dilute liquids where a uniform application rate is to be maintained.

Yet another object of the present invention is to provide a low volume spray apparatus which will effect tremendous savings, and yet at the same time will bring about simpler techniques for the user.

It has now been discovered that, by delivering the liquid to a rotating, oscillating or similarly moving spray head from which the liquid is actually ejected by the centrifugal forces developed, a highly uniform spray, composed essentially of particles of large size, can be formed even at very low delivery rates.

The oscillating rotating spray head comprises a substantially circular central portion, drop distributing fingers mounted around and extending outwardly of said central portion, a pivot point on said central portion and located axially thereof about which said central portion may rotate, and drive means adapted for oscillating or reciprocating rotation of said central portion about said pivot point.

Most conveniently, as will be explained hereinafter, the spray head defined will also include a wall around said central portion (intermediate the central portion and the drop distributing members), said wall defining a substantially cylindrical well, the base of which is said central portion. In this preferred embodiment, the drop distributing members are actually mounted on and around the top of said wall.

Before explaining the spray head in more detail, it will be useful to discuss its mode of action. First, the spray head is, in the preferred embodiment, horizontally mounted at its pivot point and driven so that it pivotally oscillates back and forth in a horizontal plane. Second, the liquid to be sprayed is delivered to the center of the central portion to the defined cylindrical well, falling under gravity to the base of that volume and moving under centrifugal force to the walls bounding the central portion and defining the cylindrical well. Third, the liquid to be sprayed, under centrifugal force, is urged into contact with the drop distributing members (in the preferred embodiment, first travelling up the walls defining the cylindrical volume). Fourth, the liquid, still under centrifugal force, travels along the drop distributing fingers to the ends thereof, where it forms droplets which are hurled off into space.

If the spray head is to provide, as is required, a uniform spray—both as to drop size and as to drop distribution—it is generally necessary that the liquid being sprayed is supplied, substantially evenly, to each individual drop distributing fingers. This means, for example, that when a flat central portion with no walls is employed, the liquid must move from the central portion's center to the drop distributing members as a thin film covering the whole of the surface of the central portion. Normally, the liquid is unlikely to so thoroughly wet the surface that this requirement is fulfilled, and so it may be necessary to add, to the liquid, a wetting agent. Other means, of course, can be employed to provide an even supply of liquid. For example, the central portion may be concentrically grooved. A simpler solution, however, is to provide the wall around the central portion—as in the defined preferred embodiment—so that, even if the actual movement of the liquid across the central portion is uneven, a ring of liquid bounded by the walls will allow even distribution at each drop distributing member.

Other objects and many of the attendant advantages of this invention will be readily appreciated as the same becomes better understood by reference to the following detailed description when considered in connection with the accompanying drawings wherein:

FIG. 1 is an elevational view showing a preferred embodiment of the spray apparatus with movable head constituting the present invention;

FIG. 2 is a top plan view of the spray apparatus of FIG. 1;

FIG. 3 is an enlarged view showing the frame and associated drive means and spray head which form a part of the present invention;

FIG. 4 is a detail view showing the attachment of the drive rod to a driving roller;

FIG. 5 is a detail view showing the operation of valve means to cut off flow through a feed tube; and FIG. 6 is an enlarged sectional view taken along the lines 6—6 of FIG. 1 showing a cross section of the spray disc and feed tube arrangement.

Referring now in greater detail to the various figures of the drawings wherein like reference characters refer to like parts, there is shown at 10 in FIG. 1 a spray apparatus with movable head constituting an embodiment of the present invention.

As indicated in FIG. 1, the spray apparatus of the present invention basically comprises an oscillating spray head or disc 12 that depends from a frame 14, with feed means including a tank 16 supported on the frame 14 and having a feed tube 18 extending from the tank 16 toward spray disc 12. The spray apparatus 10 also includes a drive means including a reciprocable drive rod 20 (FIG. 3) for oscillating the spray disc 12.

It can be seen from FIG. 1 that the spray disc 12, the tank 16 and the drive connection including drive rod 20 are all mounted upon the frame 14. A handle 22 is provided as well as a tow rod 24 that includes a leg 26 which is resiliently held to the handle 22 by means of resilient fastener 28.

It will be noted from FIG. 1 that the handle 22 also includes a hand grasp 30. As further seen in FIG. 1 the handle 22 is hollow to allow the passage of a cable 32 from upper lever 34 downwardly to the handle until lowermost tip 36 of the cable 32 that is secured to valve means 38 as will be described hereinafter.

It can also be seen from FIG. 1 that the frame 14 is itself supported upon a wheel 40, with the rotation of the wheel 40 serving to drive spray disc 12 as will be discussed hereinafter.

As seen in FIGS. 2 and 3 the spray disc 12 possesses a central portion 41 from which extend projecting fingers 42. The projecting fingers 42 are preferably pointed in order to aid in droplet formation, although it is contemplated that the projecting fingers may take other forms such as rectangular or trapezoidal wedges, and even the use of capillary tubes is contemplated for the projecting, droplet forming and distributing fingers 42.

Other details of the spray disc 12 can be seen in FIG. 6 wherein it is noted that the central portion 41 is somewhat depressed from the plane of the projecting fingers 42 by virtue of the existence of a wall 44, thereby creating a well 46 which allows for the momentary collection of liquid during the spraying process as will be discussed hereinafter.

The central portion 41 also includes an offset socket 48 that receives depending leg 50 of the drive rod 20. It will be seen that the socket 48 is actually the connection point for the drive rod 20, such that reciprocation of the drive rod 20 is utilized to oscillate the spray disc 12.

It will be further seen in FIG. 6 that a central shaft 52 extends upwardly from the geometrical center of the spray disc 12. It will also be observed from FIG. 6 that the spray disc 12 can be furnished as an integral unit that will include the central portion 41, the projecting fingers 42, the socket 48 and the central shaft 52.

With further reference to FIG. 6 it will be seen that the central shaft 52 telescopes within an opening 54 that is formed in the rearward portion of the frame 14 (FIG. 3). The upper portion of the shaft 52 terminates in a knob 56 that is embraced by a cap 58 which thereby serves to hold the shaft 52 revolvably to the frame 14.

It will be seen from FIG. 6 that the opening 54 also includes an elongated slot 60 that will allow liquid from the feed tube 18 to pass downwardly to discharge point 62 (FIG. 6), and then to drop into central portion 41 of the spray disc 12, and more particularly the well 46 as will be described hereinafter.

It will further be seen from FIG. 6 that the spray tube 18 terminates in a leg 64 that is received in an appropriate opening of the frame 14, with the leg 64 terminating just short of the slot 60, thereby directing liquid from the feed tube 18 into the slot 60. An appropriate shoulder 66 serves to support the leg 64. O-Ring 61 has a sealing function.

It can be seen from FIGS. 5 and 6 that the valve means 38 is actually a bar that is pivotally secured at 68 to the frame 14. The other end of the bar 38 includes a nub 70 to which is attached the cable 32. It will also be seen from FIG. 5 that an intermediate portion of the bar 38 contacts the leg 64 of the feed tube 18. Thus, when the cable 32 is urged upwardly by grasping of lever 34, the valve means 38 are in turn urged into contact with the leg 64 of the feed tube 18. Since the leg 64 is resilient, the valve means 38 can squeeze the leg 64 so that the passageway therein is closed, thereby preventing further flow of liquid until the level 34 is released.

It will be seen that the spray tube 18 is attached to the top of the tank 16 which also possesses a vent tube in a conventional manner. It will be seen from FIG. 1 that the tank 16 rests upon central portion 74 of the frame 14. It can also be seen that the feed tube 18 is connected to a feed tube extension 76 that extends downwardly within the interior of the tank 16. The vent tube 72 also includes a vent tube extension 78 that extends downwardly into the interior of the tank 16, with the tubes 76 and 78 being essentially parallel to each other. The lower end of the vent tube extension 76 is fitted with a filter 80.

In the arrangement shown in FIG. 1 the herbicidal liquid is drained from the tank 16 by a siphoning action, with the leg 64 of the feed tube 18 being located at a point lower than the intake portion of the feed tube extension 76 within the tank 16. Of course, where desired a pump or simple gravity feed may be used.

The drive means for the spray disc 12 is the reciprocating drive rod 20. The rearward depending leg 50 of the drive rod 20 is anchored in the socket 48 as previously described, and as can be seen in FIG. 3. The drive rod 20 then extends forwardly until terminating in a forward loop 82 (FIG. 4). It will be seen from FIG. 4 that the loop 82 is positioned about a nub 84 that is an integral part of and extends from the rectangular drive plate 86. It is to be observed that the nub 84 extends from the plate 86 at a point somewhat above the geometric center of the plate 86, and therefore the nub 84 is an eccentric connection.

As further seen in FIG. 4 the plate 86 is secured at 88 to a driving roller 90. It will later be seen that rotation of the driving roller 90 is conveyed directly to the plate 86 through connection 88 which is offset from the geometric center of the plate 86. Thus, the plate 88 is driven eccentrically, and this in turn causes a reciprocation from the drive rod 20 that is secured to the plate 86 as shown in FIG. 4.

It will also be seen from FIG. 4 that a washer 92 is provided in a conventional manner, with the washer 92 as well as the loop 82 being held securely to the nub 84 by means of a cotter pin 94 that passes downwardly through opening 93 in the nub 84.

It will be seen from FIG. 3 that the frame 14 terminates in arms 96 that include openings 98 which serve to support an axle 100 upon which the ground engaging wheel 40 is mounted.

It will be observed that the surface of the driving roller 90 is somewhat roughened or knurled to enhance the contact between the wheel 40 and the roller 90. It will be seen in FIG. 2 that the wheel 40 actually contacts the roller 90. In view of the foregoing rotation of the wheel 40, which contacts ground 102 in turn causes rotation of the driving roller 90. This in turn causes eccentric rotation of the plate 86 that in turn causes reciprocation of the drive rod 20. This is finally conveyed to the spray disc 12 and maintains oscillating movement of the spray disc 12.

With the lever 34 released, liquid may pass from tank 16 through feed tube 18 downwardly to slot 60 to be discharged from point 62 into well 46. The oscillating motion of the spray disc 12 causes the liquid in the well 46 to be thrown outwardly under centrifugal force onto the projecting fingers 42, with the liquid being held upon the fingers 42 by surface tension, but being guided toward the points of the fingers 42 by centrifugal force. As the liquid travels outwardly upon the fingers 42, there is a tendency to form droplets which becomes increasingly strong as the points of the projecting fingers 42 are approached.

At the point of the projecting fingers 42, droplets of essentially the same size are formed. The particular shape of the projecting fingers 42 is such that large droplets are formed, and as previously stated, the large droplets are uniform.

It is preferred that the spray disc 12 be oscillated since in this way the speed of rotation of the spray disc 12 is constantly changing, and this contributes to the formation and maintenance of a uniform pattern as will be discussed hereinafter.

The relative and absolute sizes of the various components of the spray head of this invention, while not being of vital importance, will be set forth for the purposes of illustrating the preferred embodiment.

The central portion—essentially a flat disc with the pivot point thereon—may vary in diameter from about one-half inch to about 2 inches. If the diameter is much less than one-half inch there is considerable possibility that some of the liquid being delivered to the central portion will miss, or even splash out. In either case this would result in dripping—and thus nonuniform application. If the diameter is much more than 2 inches then the central portion may act as a reservoir for liquid, so that some is retained when the rotation is stopped. This could be spilled, giving again, nonuniform application.

The walls bounding the central portion, when present, are generally from about one thirty-second to about three-eighths inch high. If they are much less than one thirty-second inch, then liquid fed onto the central portion could well be flung off randomly, non-uniformly and too fast. If they are much higher than three-eighths inch then again the central portion acts as a reservoir from which considerable amounts of liquid may not be able to escape.

The drop distributing fingers project out from the central portion providing a pathway along which the liquid is driven until it is hurled off the end of each member as drops. If the spray head includes the wall, then these members may be tubular, being set into the wall. They may also simply be flat, triangular-shaped spikes projecting from the top of the wall or from the central portion itself. In either case, their size (the aperture of the tube or the base of the triangle) influences the size of the drop flung off. This is described in more detail hereinafter with reference to the drawings, but the reason may simply be explained as follows.

In the case of the tubular members, the liquid enters the tubes at a rate depending directly on the size of the tube opening. As it reaches the far end of the tube, emerging into the open, surface tension forces force it into a drop whose size depends on the aperture of the tube; the larger the aperture, the larger the drop. In the case of the triangular spikes, much the same effect is seen. The amount of liquid entering each spike depends on the width of the base of the spike; as that amount of liquid advances towards the apex, surface tension forces again force it to take drop form, the size of each drop depending on the amount of liquid entering the spike. Generally speaking, the optimum sized drop if from 400 to 1,500 microns in diameter, as discussed hereinafter, and corresponding aperture and base sizes are about 100 to 1,000 microns for the tube and 500 to 5,000 microns for the spike.

The length of the drop distributing member is also, of course, a factor in determining drop size since, as will be appreciated, the longer it is the greater the centripetal acceleration of the tip, and the smaller the size of any drop coming off the tip. Generally, for a drop size between 400 and 1,500 microns, the length of the drop distributing member is between 2 inches and one-half inch.

The number of drop distributing members is also an important factor, as is the distance between the base of each member. Generally speaking, the smaller the number of members the larger the drop size and the less dense the pattern of drops. Thus, with as few as, for example, three drop distributing members, there is a definite tendency for the drops to be too large (with the attendant possibility of any inherent instability causing break-up—with satellite formation). The reverse is also true; the larger the number of members the smaller the drop size. With as many as 100 members, for example, there is a definite tendency towards very small drops—100 microns and less—which could cause serious drift problems when spraying a herbicidal liquid.

Therefore, while it must be appreciated that other facts (such as the liquid feed rate, the dimensions of the spray head, the rate of rotation and oscillation) are involved in determining drop size and other spray characteristics, nevertheless it is preferred to employ between 30 and 70 drop distributing members, with a generally optimum number of about 50.

As mentioned above, the distance between the bases of adjacent drop distributing members is also a factor to be considered. If this distance is large—comparable, for example, to the width of the member—then there exists the possibility that some of the liquid will be ejected from the central portion itself (between adjacent drop distributing members) without first travelling along to the top of the member. This is undesirable, since it increases the possibility of nonuniformity, both in drop size and in the spray pattern. It is preferred, therefore, that the bases of adjacent members be close together—particularly that they be continuous—to minimize or do away with any tendence to nonuniformity.

The spray head of this invention oscillates about the pivot point, and it is provided with drive means for this purpose. The mechanism involved in this drive means can be of a number of different types. One type, for example, comprises a drive point mounted non-axially of the central portion and adapted to coact with a reciprocating rod, or other linkage, powered by a prime mover. Another type comprises a crank arm attached to the pivot point, and likewise adapted to coact with a reciprocating rod. A third type, different from the first two, comprises an offset weight attached either to the central portion or to a crank arm on the pivot point. Here, instead of using a rod to move the crank arm, the spray head is so attached to the prime mover that the whole device oscillates back and forth; however, because the weight is offset, the net result is to cause the spray head to oscillate also around the pivot point at the resonance frequency of the whole system.

The central portion of the spray head of this invention has thereon a pivot point about which the spray head may rotate, and it may have a drive point at which can be mounted reciprocating or oscillating drive means. The pivot point is located axially of the central portion, and, indeed, is conveniently an axle to which the spray head is rigidly fixed and which can be mounted for rotation on the spray apparatus of the invention. Conveniently, this axle projects upwardly from the central portion, so that, when used in the spray apparatus, the spray head depends therefrom. The drive point is located non-axially of the central portion, and conveniently comprises a socket in or mounted on the central portion so that reciprocating drive means may be attached thereto. In a spray apparatus the drive means will push the spray head back and forth so that it rotates reciprocally about the pivot point.

It is convenient that the reciprocating motion of the spray head should oscillate it back and forth through an angle of about 45° to 50° . With considerably smaller angles—of the order of 2° or 3°—there is some difficulty in attaining an angular velocity high enough to throw drops an adequate distance from the spray head. With considerably larger angles—of the order of 180° and greater—there is a tendency for nonuniform spray patterns, not to mention the somewhat increased problem of designing the mechanics of the device. Generally, a suitable range of angles is from about 10° to about 90°.

The distance of the drive point from the pivot point is a fairly important factor; for any particular driving speed, the smaller this distance is the higher will be the rotational velocity of the spray head, and the further the drops will be flung. A distance of from one-fourth to three-fourths inch is preferred when the apparatus is being driven at 2 to 4 m.p.h., and generally it is more convenient to employ a fairly small distance than a large distance.

The spray apparatus of this invention includes, and makes use of, the spray head of the invention. It may be defined as comprising:

a. The spray head as described herein;
b. Reciprocating drive means for said spray head;
c. Feed means for supplying the liquid to be sprayed to said spray head; and d. A frame on which the spray head, the drive means and the feed means are mounted.

Conveniently, the spray apparatus also comprises valve means for cutting off the flow of liquid through the feed means when it is no longer desirable to feed liquid to the spray head. Furthermore, it is particularly convenient if the frame includes a mounting for a reservoir in which the liquid to be sprayed is stored before it is fed to the spray head.

The reciprocating drive means is conveniently a rod, adapted for attachment to the drive point on the central portion of the spray head, and coacting with a prime mover so as to reciprocate when the prime mover is in operation. This prime mover may be, for example, an electric motor, or it may be, preferably, a wheel in contact with the ground across which the spray apparatus is employed.

The feed means is simply a pipe, conveniently a flexible pipe, through which the liquid to be sprayed can be delivered to the spray head. The liquid may be delivered directly to the central portion of the spray head, or it may be delivered onto the spray head axle, down which it will then run to the central portion itself. The feed means may employ power to drive the liquid therealong—for example, a pump—but conveniently it uses a siphoning action. Preferably the feed means also contains a valve whereby the flow may be stopped, and when the feed means is a flexible pipe the valve may simply be a squeezing device acting to pinch the pipe shut. Other types of valves, of course, may be employed.

The frame serves mainly as a base on which the spray head, drive means and feed means can be mounted. Preferably it also serves as a base on which a reservoir for the liquid being sprayed can be mounted, and on which the prime mover for the drive means can be mounted. In connection with the reservoir, it will be appreciated that, if a siphoning action is to be employed to deliver the liquid along the feed means to the spray head, the reservoir must be mounted so that it is above the level of the exit of the feed means.

The frame will conveniently take a shape dictated by the use to which the spray apparatus is to be put. For instance, if the apparatus is to be hand-held and hand-powered then it should be so constructed as to have a handle such that a walking man can comfortably hold and direct the apparatus. If, however, the apparatus is to be towed behind a tractor then the frame should be of an appropriate shape, and should conveniently include means whereby it can be attached to the tractor or to a tow bar thereon.

In the foregoing description, emphasis has been laid on the need for the spray head to rotate in a reciprocatory—or oscillatory—manner. If the spray head rotated without reciprocating then the force with which drops were flung off the drop distributing members would be constant (for a constant rotational speed) and each drop would be flung very much the same distance; as a result there would be a higher concentration (drops per sq. ft.) of drops flung out at the sides of the apparatus (the line of movement being considered to be front and back) than at any other point. However, if the spray head is rotated in a reciprocal fashion then, because it is constantly changing its rotational velocity, the drops are flung out a distance which varies with the spray head's rotation, and so all the area reached by the spray is covered uniformly.

The spray head and apparatus of this invention are generally designed to give a coarse spray—that is, to give a spray having a fairly large (400 to 1,500 microns) particle size. Accordingly, there is little danger of drift since the particles are generally too large to be influenced by winds, even winds of up to 15 m.p.h. Nevertheless, it is preferred to employ the apparatus so that the spray has a minimal vertical distance to travel—of the order of from about 3 to 18 inches—before it touches the area being sprayed. However, with the spray head so close to the ground—or other target area—it is important that its rotational velocity be high, so that a good width of spray path is obtained.

At a driving speed of from 2 to 4 m.p.h., with a distance between pivot and drive points of from one-fourth to three-fourth inch, a spraying height of 18 inches will give a spray path of from 5 to 7 ft. wide. With a preferred spraying height of 1 ft., a driving speed of 3 m.p.h. and a drive pivot point distance of one-half inch, the path has a width of about 4 to 5 ft. With a spray height of 3 inches, however, the path has a width of only 3 to 4 ft.

The spray head and apparatus of this invention can be made from any reasonably rigid, non-corrodible materials or materials such as metal or plastic.

While the preferred embodiment of the invention contemplates a spray disc having an oscillating motion, it is also contemplated that the spray disc may undergo other types of regular or irregular motion, including rotation, particularly where uniformity of spray pattern is less important whereas uniform large droplet size is to be maintained.

Without further elaboration, the foregoing will so fully illustrate my invention, that others may, by applying current or future knowledge, readily adapt the same for use under various conditions of service.

What is claimed as the invention is:

1. A spray apparatus comprising a spray disc generally disposed in a horizontal plane and movable about a generally vertical axis and oscillating drive means to oscillate said spray disc about said axis, said spray disc having a central depressed portion and a plurality of pointed discharge fingers extending outwardly thereof, feed means to deliver a liquid to said central depressed portion, with the oscillation of said spray disc about said axis being of variable speed and direction to cause said liquid to be carried out of said central depressed portion and onto said fingers to be discharged therefrom.

2. The spray apparatus of claim 1 including a handle extending from said frame, releasable cable means extending through said handle to valve means adapted to be actuated thereby to prevent further flow of said liquid through said feed means.

3. The spray apparatus of claim 1 wherein oscillating drive means causes said spray disc to be rotated in an arc from 10° to 180°.

4. The spray apparatus of claim 3 wherein said fingers terminate outwardly in sharp points.

5. The spray apparatus of claim 3 wherein said feed means include a tank mounted on said frame, with a feed ed tube extending from said tank to a point adjacent said spray disc.

6. The spray apparatus of claim 3 wherein said disc includes a central shaft, with said feed means delivering liquid adjacent said central shaft.

7. The spray apparatus of claim 6 including a frame, said spray disc and feed means being secured upon said frame, with said frame having an opening to receive said shaft.

8. The spray apparatus of claim 7 wherein said opening includes a slot to permit liquid delivered by said feed means to travel to said spray disc.

9. The spray apparatus of claim 7 including a ground engaging wheel revolvably held by said frame, said wheel being operatively connected to said drive means in order to move said spray disc.

* * * * *